United States Patent [19]

Graham

[11] Patent Number: 4,640,772
[45] Date of Patent: Feb. 3, 1987

[54] OIL CLEANING ASSEMBLIES FOR ENGINES

[75] Inventor: Neil A. Graham, Somerset, England

[73] Assignee: AE PLC, Warwickshire, England

[21] Appl. No.: 731,168

[22] Filed: May 6, 1985

[30] Foreign Application Priority Data

May 4, 1984 [GB] United Kingdom ............... 8411502

[51] Int. Cl.$^4$ .................... B01D 27/06; B01D 45/12
[52] U.S. Cl. .................. 210/295; 210/416.5; 210/DIG. 13; 210/DIG. 17
[58] Field of Search ............ 210/360.1, 360.2, 361, 210/295, 369, 299, 372, 308, 374, 309, 380.1, 781, 416.5, 168, 378, 379, 295, 296, 299, 304, 305, 306, DIG. 13, DIG. 17, 133

[56] References Cited

FOREIGN PATENT DOCUMENTS 876299 8/1961 United Kingdom ............... 210/133

Primary Examiner—Frank Sever
Attorney, Agent, or Firm—Pearne, Gordon, McCoy & Granger

[57] ABSTRACT

An oil cleaning assembly for an engine comprising a centrifugal separator and a filter which are both releasably connected at one end to a mounting means and which both have an oil inlet and an oil outlet at said end, the centrifugal separator being arranged to extend substantially vertically upwards from the mounting means and the mounting means providing a common oil supply passage for the separator and filter, a drain passage for draining oil from the separator to the engine sump and a discharge passage from the filter for supplying oil to the engine lubrication system.

8 Claims, 9 Drawing Figures

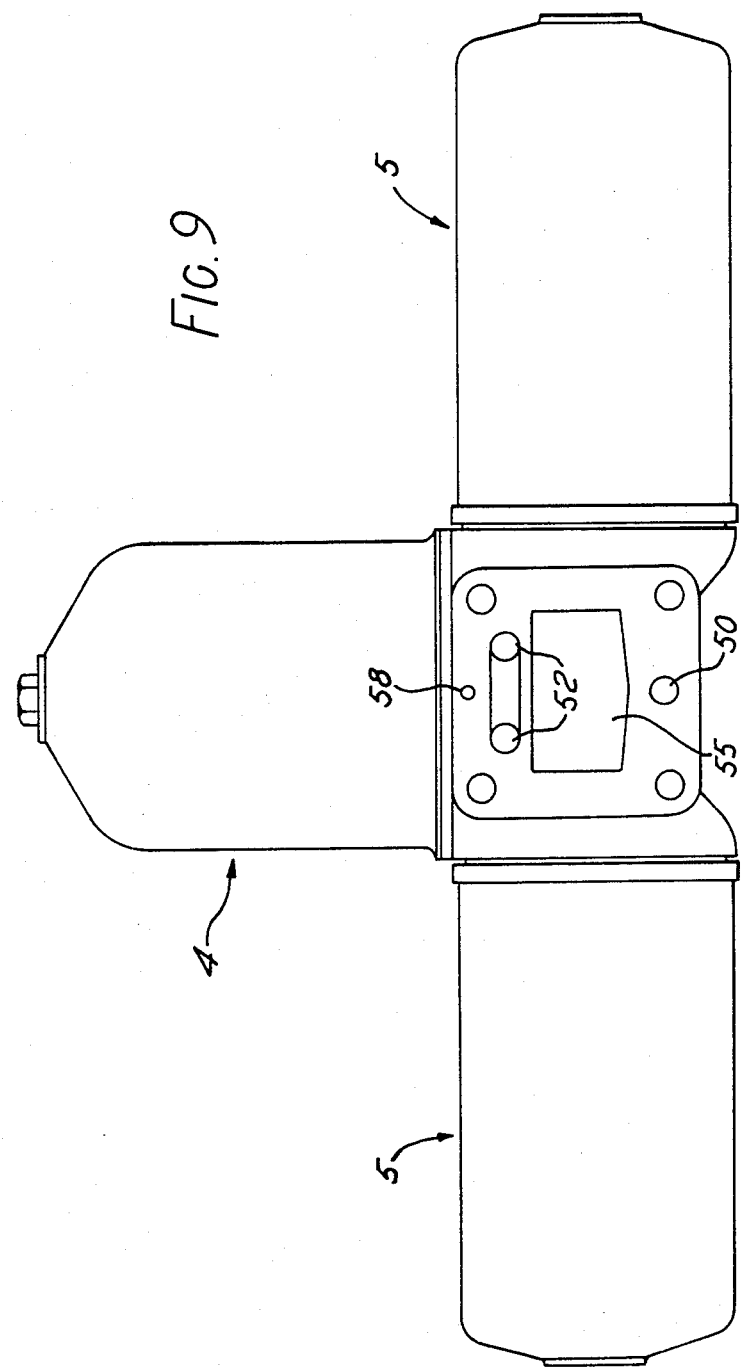

OIL CLEANING ASSEMBLIES FOR ENGINES

This invention concerns lubricating oil cleaning assemblies for engines particularly internal combustion engines. Servicing engines and particularly car and truck engines is a labour-intensive operation which needs to be done rapidly so disposable oil-cleaning units need to be used wherever possible.

Oil cleaning has been conventionally effected either with full flow filters which interpose a paper filter in the path of all the oil leaving the lubricating oil pump, or with centrifugal separators which by-pass a part of the oil leaving the pump and return it to the engine sump. Both arrangements have their advantages and disadvantages. Full flow filters are cheap (and thus are usually disposable) and filter all the oil each time it is cycled but tend to get clogged which hampers the efficiency of the lubricating system. This is particularly the case if the filter element has fine pores to remove fine contaminants. On the other hand, fine contaminants are not such a problem with centrifugal separators.

Although disposable centrifugal separators have previously been proposed, they have been of the spin-on type which depends from a mounting in the same way as disposable filters. However, because centrifugal separators normally drain by gravity to the sump, a second pipe connection at their lower end has had to be provided which is a serious drawback.

In the preferred forms of the present invention, the separator itself is not disposable but the rotor is. A disposable rotor should be non-disassemblable and tamperproof and helps prevent ingress of dirt during maintenance.

According to one aspect the invention provides an oil cleaning assembly for an engine comprising a centrifugal separator and a filter which are both releasably connected at one end to a mounting means and which both have an inlet and an oil outlet at said end, the centrifugal separator being arranged to extend substantially vertically upwards from the mounting means and the mounting means providing a common oil supply passage for the separator and filter, a drain passage for draining oil from the separator to the engine sump and a discharge passage from the filter for supplying oil to the engine lubrication system.

According to another aspect the invention provides an oil cleaning assembly for an internal combustion engine comprising a centrifugal separator and a filter extending outwardly from and releasably connected to a mounting means which provides at least an oil inlet connection, the separator being disposed substantially vertically and the filter being angularly displaced therefrom.

According to a further aspect the invention provides an oil cleaning assembly for an internal combustion engine, comprising a by-pass flow substantially vertically disposed centrifugal separator having an outer casing and a rotor rotatable therein, at least the rotor being disposable, a full flow filter having an outer casing and a filter element therein, at least the filter element being disposable, and a mounting member for mounting said casings by means of a screw thread connection in such a way that the separator casing is upstanding from the mounting member the mounting member having first passage means for supplying high pressure oil from the engine pump to an inlet of each said separator and said filter, second passage means for receiving oil from said centrifugal separator and returning it to the engine sump and third passage means for receiving oil from said filter and supplying it to a pressurised engine lubricating system.

The invention also extends to such a mounting member.

Preferred embodiments of the invention will now be described with reference to the accompanying drawings in which:

FIG. 9 is a view similar to FIG. 5 of a fifth embodiment.

Figures 1, 3:
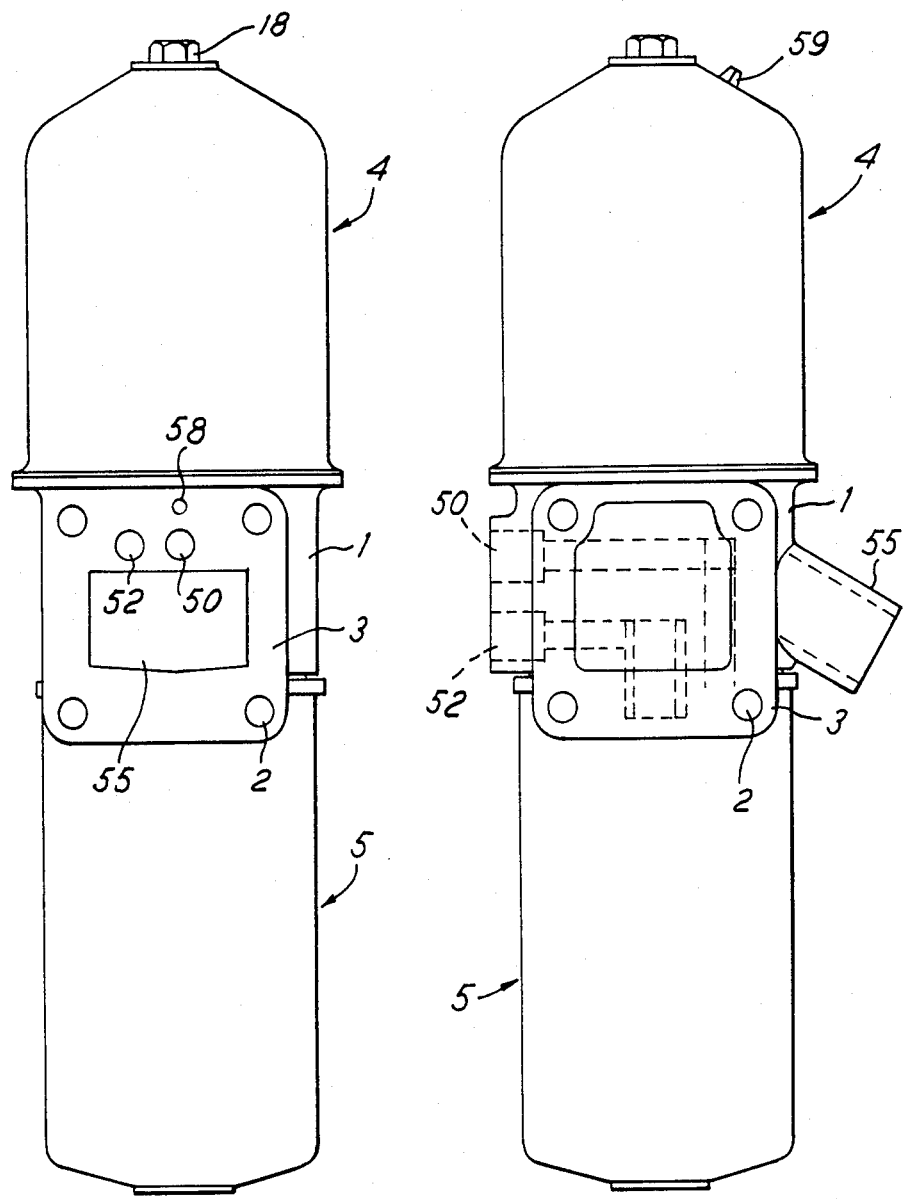
FIG. 1 is an elevation of an assembly according to the invention.
FIGS. 3 and 4 are views similar to FIGS. 1 and 2 of a second embodiment.
Figure 2:
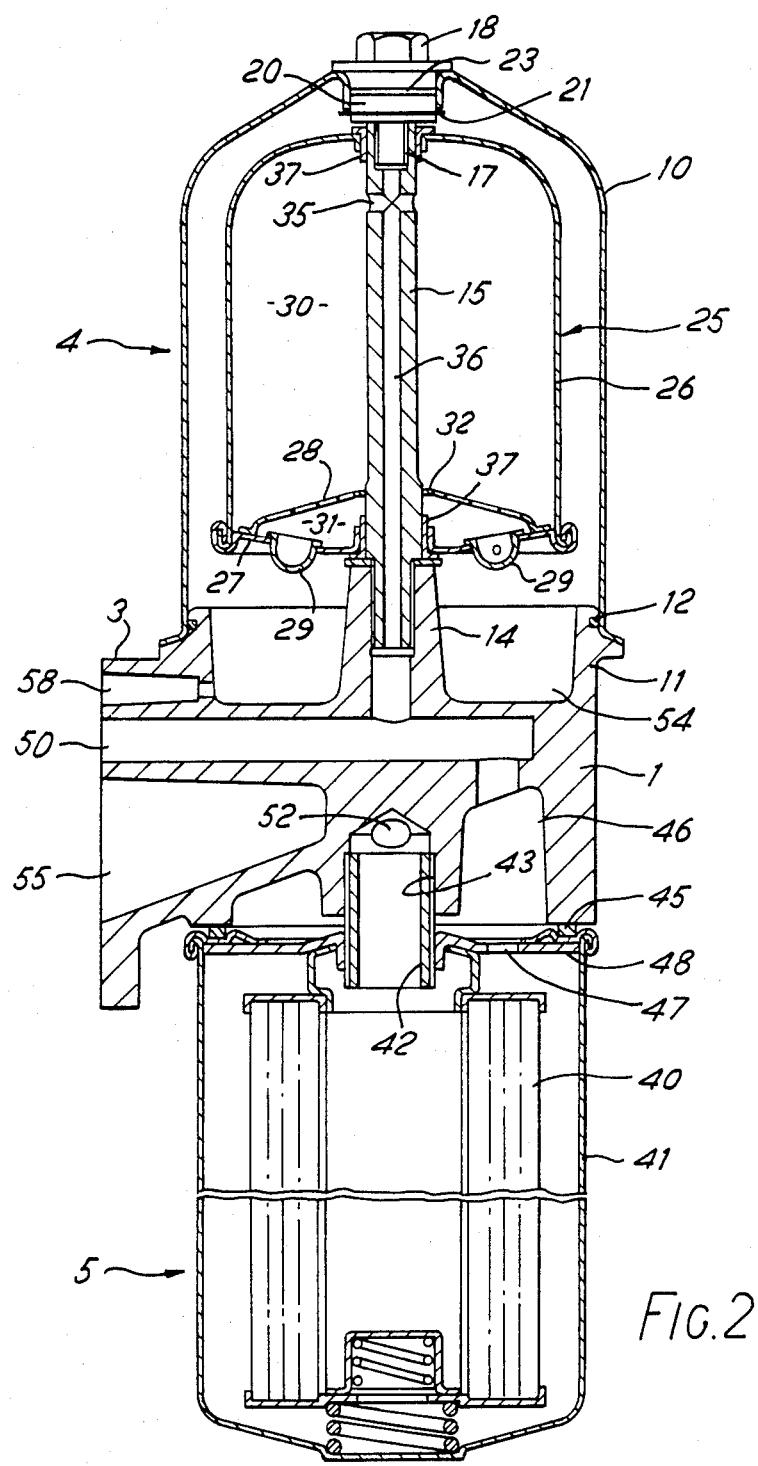
FIG. 2 is a median vertical section in a direction at right angles to the view shown in FIG. 1.

As shown in FIGS. 1 and 2, a mounting member 1, which in use is bolted to an engine by means of four bolt holes 2 in a mounting flange 3, carries a centrifugal separator 4 and a filter 5 for cleaning the lubricating oil used in the engine and is conveniently a metal casting.

The centrifugal separator 4 has a bell-shaped housing 10 which fits over the outside of an upstanding circular wall 11 on the member 1 and a seal 12 is mounted in a groove in the wall 11 to prevent leakage of oil. A tubular projection 14 extends upwardly from the member 1 coaxially with the wall 11 and screwed into the upper end of the projection 14 is a hollow shaft 15. At the upper end of the shaft 15 a threaded bore 17 receives a retaining bolt or stud 18 which is held captive in an opening 20 in the top of the housing by circlip 21, a seal 23 being provided in a groove in the bolt 18 to prevent leakage of oil. Thus the housing 10 is held in place by screwing the bolt 18 into the shaft 15 by means of a spanner or the like.

A pressed metal disposable rotor 25 is freely rotatable on the shaft 15 and comprises a bell-shaped rotor housing 26, a base plate 27, an intermediate plate 28 and a pair of jets 29. The intermediate plate 28 is welded to the base plate 27 to define an upper chamber 30 and a lower chamber 31 which communicate through an annular space 32 adjacent the shaft 15. The base plate 27 is secured to the housing 28 by a fold-over or welded joint and the two hemispherical flanged jets 29 are secured in openings in the base plate so that oil leaving them is directed tangentially in the same rotary direction so as to spin the rotor and cause contaminants in the oil to be deposited on the outer wall of the upper chamber 30. Alternatively, the jets can be formed in the pressing of the base plate. Oil enters the upper part of the chamber 30 via a transverse bore 35 which intersects the longitudinal bore 36 in the shaft 15. Flanged annular bearing members 37 of suitable bearing metal are provided at the top and bottom of the rotor 25 between the rotor and the shaft.

The filter 5 depends from the mounting member 1 and is a conventional disposable spin-on filter with a corrugated paper filter element 40 in a casing 41. A threaded outlet spigot 42 screws into a bore 43 in the member 1 and a ring seal 45 on the upper surface of the filter seals against the under side of the member 1. An annular oil channel 46 in the member 1 supplies oil to the filter 5 through a series of holes 47 in its top plate 48.

The annular oil channel 46 and the tubular projection 14 are both supplied with oil under pressure from the engine pump via a bore 50. Return oil from the filter 5 passes from spigot 42 through a passage 52 to the engine lubricating rail. Oil leaving the jets 29 collects in annular chamber 54 and drains freely to the engine sump under gravity via passage 55. An air vent 58 connects chamber 54 to the atmosphere or to a low pressure air supply (see our UK Patent Application No. 2113122) and ensures that air entrained by the oil draining to the sump is replaced and that oil does not back up and stop the rotor. A check valve (not shown) may be provided in the air vent passage to prevent oil loss.

Figure 4:
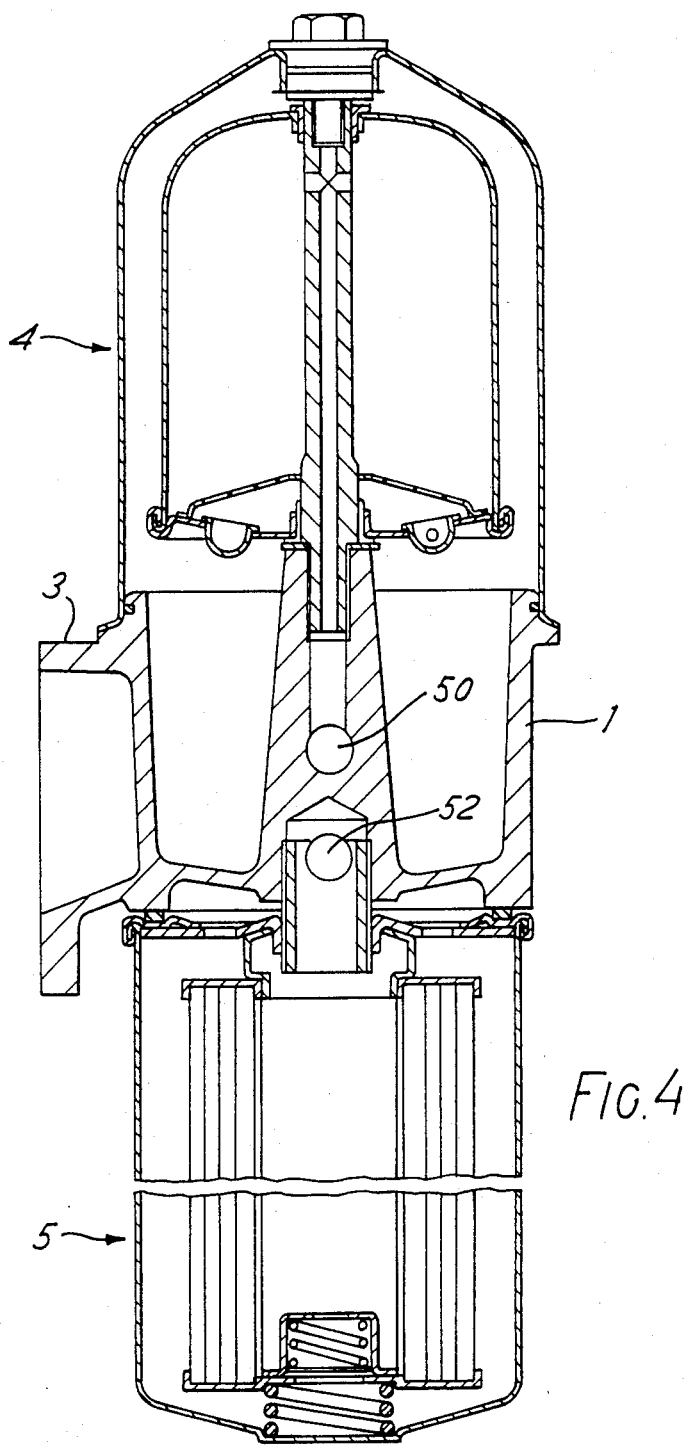

The arrangement in FIGS. 3 and 4 is similar to that in FIGS. 1 and 2 except that oil enters and leaves via separate lines at right angles to the mounting flange 3 and not through it. An air vent may be provided at 59.

Figure 5:
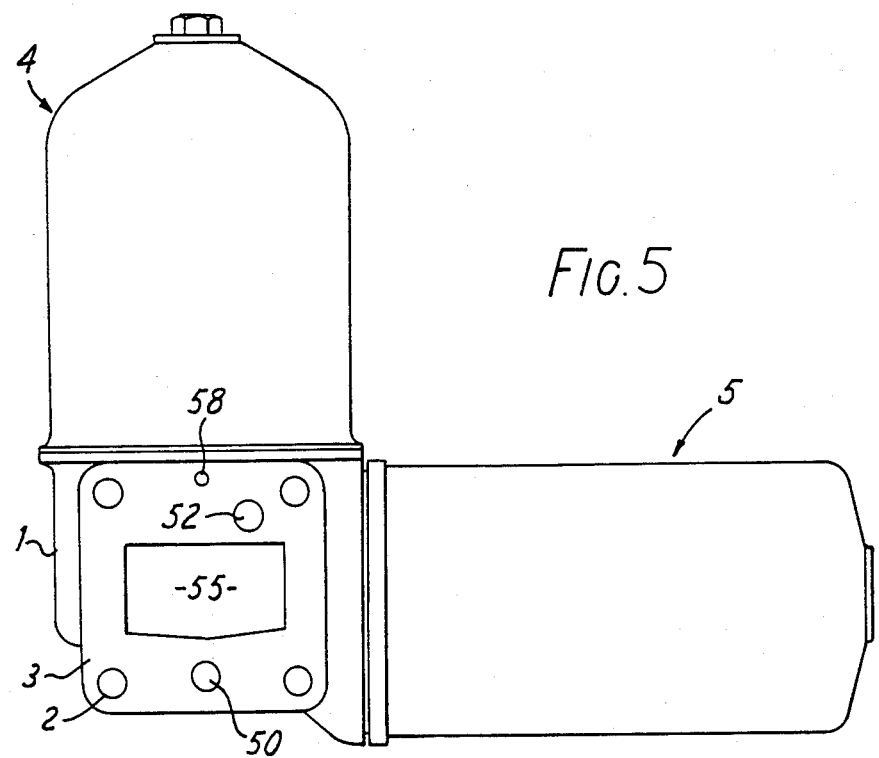
FIGS. 5 and 6 are views similar to FIGS. 1 and 2 of a third embodiment.
Figure 7:
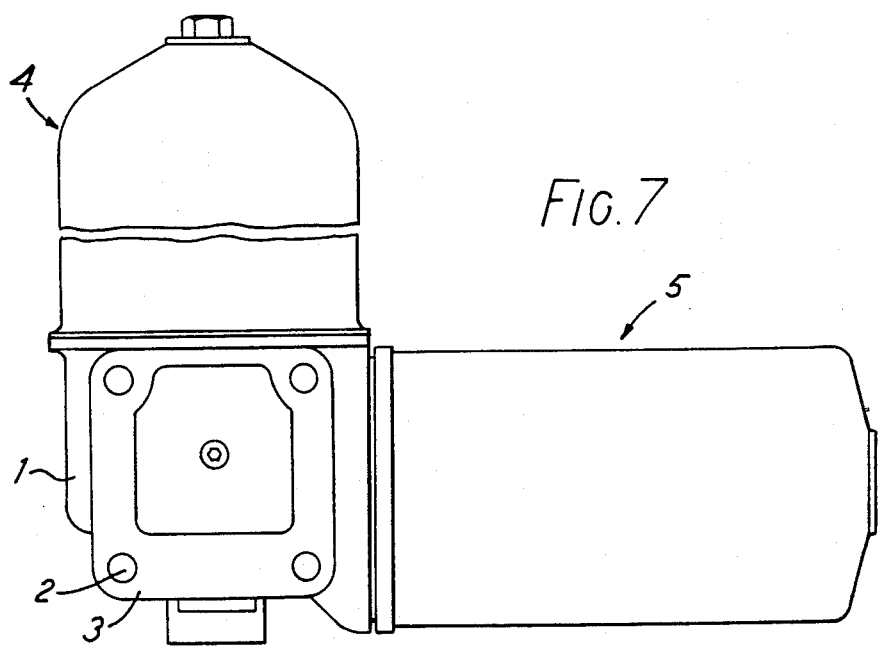
FIGS. 7 and 8 are views similar to FIGS. 1 and 2 of a fourth embodiment.
Figure 6:
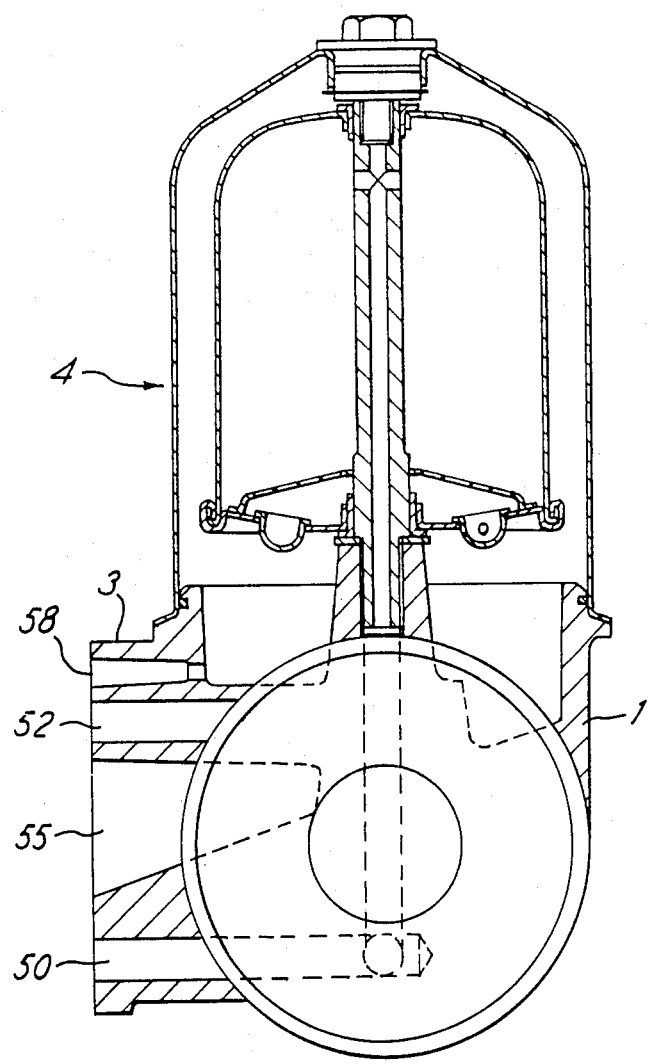
Figure 8:
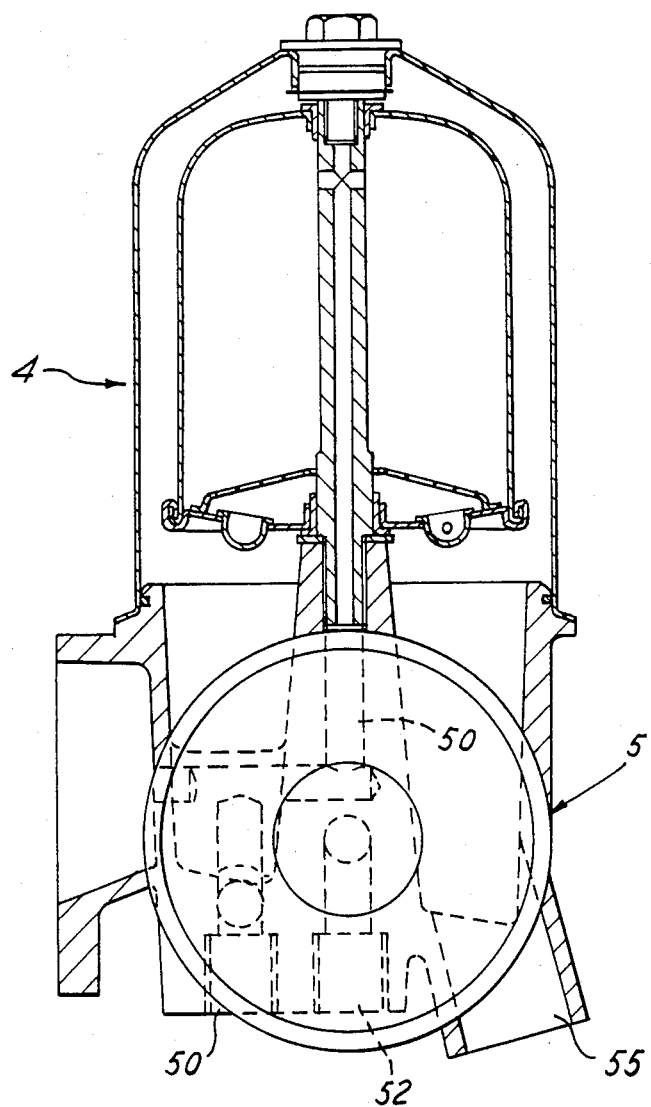

FIGS. 5 and 6 show an arrangement similar to that in FIGS. 1 and 2 except that filter 5 is now horizontal and FIGS. 7 and 8 show a modification of the FIGS. 5 and 6 arrangement where oil enters and leaves through separate lines rather than through the mounting flange. FIG. 9 shows an arrangement similar to FIGS. 5 and 6 in which two filters 5 are mounted on the mounting member 1 and extend in opposite directions.

I claim:

1. An oil cleaning assembly for an internal combustion engine, comprising means for enabling oil to flow through both a separator unit and a filter unit at all times when oil flows through a passage, including, a by-pass flow substantially vertically disposed centrifugal separator unit having an outer casing and an oil nozzle-driven rotor rotatable therein, the rotor being non-openable and disposable, a full flow filter unit having an outer casing and a filter element therein, at least the filter elememt being disposable, and a mounting member for mounting said casings by means of screw thread connections in such a way that the separator casing is upstanding from the mounting member, means for enabling both of said casings to be independently removable from said mounting member, the mounting member having first passage means for supplying high pressure oil from the engine pump directly to an inlet of each said separator unit and said filter unit, second passage means for receiving oil from said centrifugal separator unit and returning it to the engine sump and third passage means for receiving oil from said filter unit and supplying it to a pressurised engine lubricating system.

2. An assembly according to claim 1 wherein the filter unit is angularly displaced from the separator unit.

3. An assembly according to claim 2, wherein the filter unit is displaced by 180°.

4. An assembly according to claim 2, wherein the filter unit is displaced by 90°.

5. An assembly according to claim 4 wherein there are two filters displaced by 90° from the separator unit and aligned with each other.

6. An assembly according to claim 1, wherein the mounting means is a casting with a mounting surface adapted to be bolted on the engine.

7. An assembly according to claim 6 wherein the inlet and outlet passages are provided in the mounting surface.

8. An assembly according to claim 1 wherein the rotor is freely rotatable on a shaft through which oil may be supplied to it, and has nozzles at the lower end thereof by which the oil leaves the rotor, the nozzles being arranged so that the reaction force spins the rotor.

* * * * *